United States Patent
Shoda et al.

(10) Patent No.: US 10,747,996 B2
(45) Date of Patent: Aug. 18, 2020

(54) IDENTIFICATION METHOD, IDENTIFICATION APPARATUS, CLASSIFIER CREATING METHOD, AND CLASSIFIER CREATING APPARATUS

(71) Applicant: Panasonic Intellectual Property Corporation of America, Torrance, CA (US)

(72) Inventors: Yukie Shoda, Osaka (JP); Toru Tanigawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 24 days.

(21) Appl. No.: 15/802,435

(22) Filed: Nov. 2, 2017

(65) Prior Publication Data

US 2018/0137336 A1    May 17, 2018

(30) Foreign Application Priority Data

Nov. 15, 2016  (JP) .................................. 2016-222178

(51) Int. Cl.
*G06K 9/00* (2006.01)
*G06T 9/00* (2006.01)
(Continued)

(52) U.S. Cl.
CPC ....... *G06K 9/0063* (2013.01); *G06K 9/00805* (2013.01); *G06K 9/46* (2013.01);
(Continued)

(58) Field of Classification Search
CPC ............. G06K 9/00805; G06K 9/6228; G06K 9/6255; G06K 9/6256; G06K 9/626; G06K 9/6227; G06K 9/0063; G06K 9/46; G06K 9/628; G08G 1/166; G08G 1/09623; G06T 9/002

See application file for complete search history.

(56) References Cited

U.S. PATENT DOCUMENTS 9,886,454 B2 * 2/2018 Cho ..................... G06F 16/51
2008/0037878 A1 * 2/2008 Katta ................ H04N 1/00132
382/224

(Continued)

FOREIGN PATENT DOCUMENTS

EP          3336755 A1 * 6/2018  ............. G06K 9/629
JP       2004-213567      7/2004
JP      2004213567 A  *  7/2004

OTHER PUBLICATIONS

The Partial European Search Report (R.64 EPC) dated Apr. 9, 2018 for the related European Patent Application No. 17201112.4.
(Continued)

*Primary Examiner* — Brenda C Bernardi
(74) *Attorney, Agent, or Firm* — Greenblum & Bernstein, P.L.C.

(57) ABSTRACT

An identification method includes acquiring image data, acquiring a photography condition for the image data, selecting a classifier corresponding to the acquired photography condition from a plurality of classifiers, each of which was created for one of a plurality of different photography conditions, and identifying a target in the acquired image data by using the selected classifier.

20 Claims, 7 Drawing Sheets

(51) Int. Cl.
  *G06K 9/46* (2006.01)
  *G06K 9/62* (2006.01)
  *G08G 1/16* (2006.01)
  *G08G 1/0962* (2006.01)

(52) U.S. Cl.
  CPC ............ *G06K 9/626* (2013.01); *G06K 9/628* (2013.01); *G06K 9/6227* (2013.01); *G06K 9/6228* (2013.01); *G06K 9/6255* (2013.01); *G06K 9/6256* (2013.01); *G06T 9/002* (2013.01); *G08G 1/09623* (2013.01); *G08G 1/166* (2013.01)

(56) References Cited

U.S. PATENT DOCUMENTS

| | | | | |
|---|---|---|---|---|
| 2009/0252404 A1* | 10/2009 | Lecerf | ............... | G06K 9/6254 382/154 |
| 2010/0283855 A1* | 11/2010 | Becker | ............... | G06K 9/00818 348/148 |
| 2012/0245832 A1* | 9/2012 | Meis | ............... | G06K 9/00798 701/116 |
| 2013/0101157 A1* | 4/2013 | Li | ............... | G06K 9/00805 382/103 |
| 2014/0029852 A1* | 1/2014 | Pisipati | ............... | G06K 9/18 382/182 |
| 2014/0086480 A1* | 3/2014 | Luo | ............... | G06K 9/66 382/156 |
| 2014/0270548 A1 | 9/2014 | Kamiya | | |
| 2017/0236011 A1* | 8/2017 | Lakehal-Ayat | ......... | B60R 11/04 382/159 |

OTHER PUBLICATIONS

The Extended European Search Report dated Jun. 6, 2018 for the related European Patent Application No. 17201112.4.

Dorko et al: "Selection of scale-invariant parts for object class recognition", Proceedings Ninth IEEE International Conference on Computer Vision. (ICCV). Nice, France, Oct. 13-16, 2003., Jan. 1, 2003 (Jan. 1, 2001), p. 634, XP055478652.

* cited by examiner

IDENTIFICATION METHOD, IDENTIFICATION APPARATUS, CLASSIFIER CREATING METHOD, AND CLASSIFIER CREATING APPARATUS

BACKGROUND

1. Technical Field

The present disclosure relates to an identification method and identification apparatus by which a target in image data is identified by using a classifier and to a classifier creating method and classifier creating apparatus by which a classifier that identifies a target in image data is created.

2. Description of the Related Art

An identification apparatus known in related art identifies a target in image data by using a classifier. This type of identification apparatus performs mechanical learning for the classifier to increase the identification procession of the classifier (see Japanese Unexamined Patent Application Publication No. 2004-213567, for example).

SUMMARY

As mechanical learning, deep learning in which a deep neural network is used is known. In deep learning, a classifier depending on a learning data set is created. If a classifier is learned by using deviating learning data, the classifier can highly precisely identify a target in image data specialized for the learning data, but the identification precision is lowered for versatile image data. This type of learning in which deviating learning data is used is generally called overfitting.

In general, it is demanded to create a highly versatile classifier, without falling into overfitting. To create a highly versatile classifier, however, a large amount of even learning data must be collected, increasing the degree of difficulty and a cost. Another problem is that a huge amount of time is taken to use a large amount of data in learning and thereby learning may not converge.

One non-limiting and exemplary embodiment provides an identification method, identification apparatus, classifier creating method, and classifier creating apparatus by which a target can be highly precisely identified.

In one general aspect, the techniques disclosed here feature an identification method that includes acquiring the image data, acquiring a photography condition for the image data, selecting a classifier corresponding to the acquired photography condition from a plurality of classifiers, each of which was created for one of a plurality of different photography conditions, and identifying the target in the acquired image data by using the selected classifier.

According to the present disclosure, a target in image data is identified by using a classifier that has been learned by using learning-use image data acquired under the same photography condition as for image data acquired during identification, so it is possible to highly precisely identify a target.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
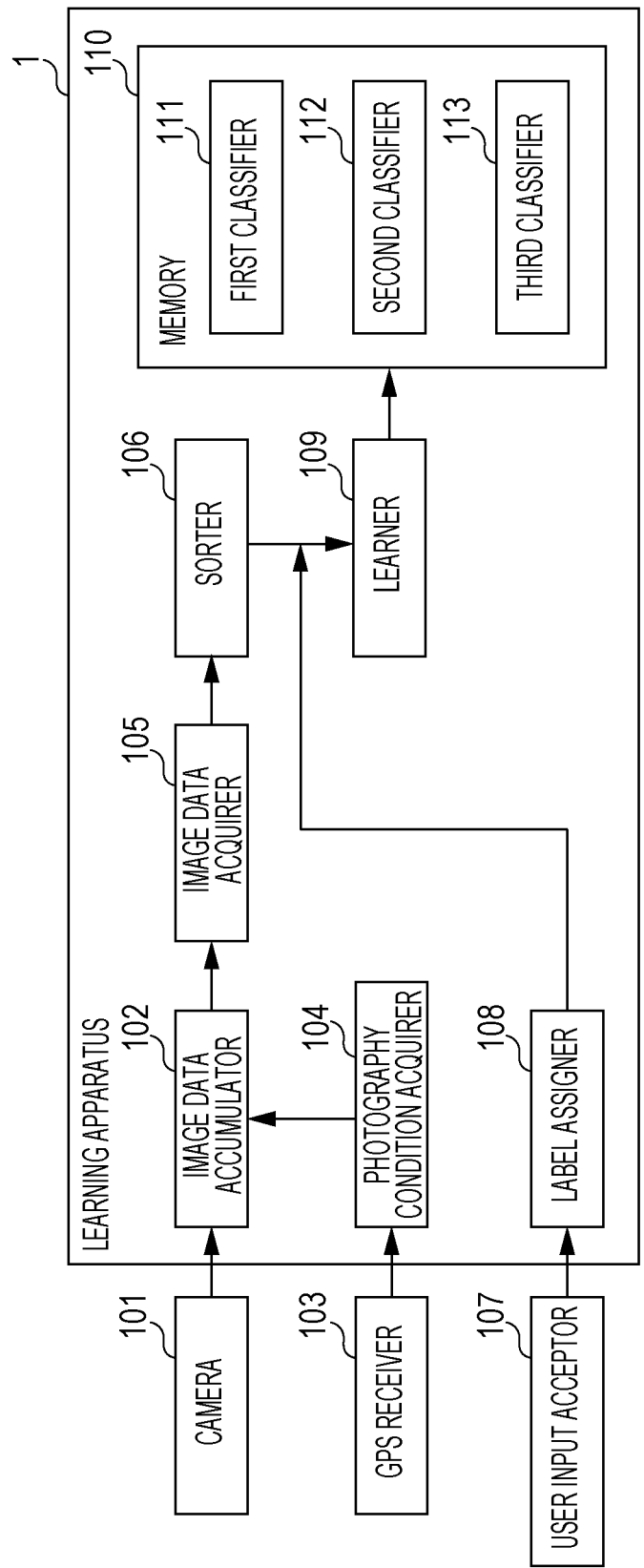
FIG. 1 is a block diagram illustrating the structure of a learning system according to a first embodiment.

Prehistory to the Invention of One Aspect According to the Present Disclosure

As mechanical learning, deep learning in which a deep neural network is used is known. In deep learning, a classifier depending on a learning data set is created. If a classifier is learned by using deviating learning data, the classifier can highly precisely identify a target in image data specialized for the learning data, but the identification precision is lowered for versatile image data. This type of learning in which deviating learning data is used is generally called overfitting.

For example, suppose that a classifier that identifies a person or road sign from an image captured by a vehicle-mounted camera has been learned by using image data captured in the USA. If the classifier is used in Japan, since the classifier has not been created by using image data captured in Japan, the identification ratio may be lowered. This is because there are differences in the pictures of road signs, sunshine conditions such as the altitude of the sun, scenes of plants, utility poles and the like, and traveling lanes between the USA and Japan.

In general, it is demanded to create a highly versatile classifier, without falling into overfitting. To create a highly versatile classifier, however, a large amount of even learning data must be collected, increasing the degree of difficulty and a cost. Another problem is that a huge amount of time is taken to use a large amount of data in learning and thereby learning may not converge.

To solve the above problems, an identification method according to an aspect of the present disclosure includes acquiring the image data, acquiring a photography condition for the image data, selecting a classifier corresponding to the acquired photography condition from a plurality of classifiers, each of which was created for one of a plurality of different photography conditions, and identifying the target in the acquired image data by using the selected classifier.

With this structure, image data is acquired, a photography condition for the image data is acquired; a classifier corresponding to the acquired photography condition is selected from a plurality of classifiers, each of which was created for one of a plurality of different photography conditions; and the target in the acquired image data is identified by using the selected classifier.

Therefore, a target in image data is identified by using a classifier that has been learned by using learning-use image data acquired under the same photography condition as for image data acquired during identification, so it is possible to highly precisely identify a target.

In the identification method described above, the plurality of classifiers may be created by entering a plurality of learning-use image data items sorted for each of the plurality of photography conditions into predetermined learning models for each of the plurality of photography conditions, learning information indicating a feature of the target for each of the plurality of photography conditions, and applying the information indicating the feature of the target to the predetermined learning models provided for each of the plurality of photography conditions.

With this structure, a plurality of classifiers is created by entering a plurality of learning-use image data items sorted for each of a plurality of photography conditions into predetermined learning models for each of the plurality of photography conditions, learning information indicating a feature of the target for each of the plurality of photography conditions, and applying the information indicating the feature of the target to the predetermined learning models provided for each of the plurality of photography conditions.

Therefore, since classifiers are learned by using only learning-use image data corresponding to a predetermined photography condition instead of unconditionally using learning-use image data, it is possible to shorten learning time.

In the identification method described above, the image data may be acquired when an imaging apparatus, which is mounted in a moving body that travels on a road, takes a picture; the photography condition may indicate a region in which the image data was acquired; the target may indicate an obstacle present on the road; in the acquiring of the photography condition, regional information may be acquired, the regional information being used to identify a region in which the image data was captured; in the selecting, a classifier corresponding to the acquired regional information may be selected from a plurality of classifiers, each of which was created for one of a plurality of different regions; and in the identifying, the obstacle in the acquired image data may be identified by using the selected classifier.

With this structure, the image data is acquired when an imaging apparatus, which is mounted in a moving body that travels on a road, takes a picture; the photography condition indicates a region in which the image data was acquired; the target indicates an obstacle present on the road; in the acquiring of the photography condition, regional information is acquired, the regional information being used to identify a region in which the image data was captured; in the selecting, a classifier corresponding to the acquired regional information is selected from a plurality of classifiers, each of which was created for one of a plurality of different regions; and in the identifying, the obstacle in the acquired image data is identified by using the selected classifier. Therefore, it is possible to identify an obstacle in image data captured in a particular region.

In the identification method described above, the image data may be acquired when an imaging apparatus, which is mounted in a moving body that travels on a road, takes a picture; the photography condition may indicate a country in which the image data was acquired; the target may indicate a road sign present on the road; in the acquiring of the photography condition, country information may be acquired, the country information being used to identify a country in which the image data was captured; in the selecting, a classifier corresponding to the acquired country information may be selected from a plurality of classifiers, each of which was created for one of a plurality of different countries; and in the identifying, the road sign in the acquired image data may be identified by using the selected classifier.

With this structure, the image data is acquired when an imaging apparatus, which is mounted in a moving body that travels on a road, takes a picture; the photography condition indicates a country in which the image data was acquired; the target indicates a road sign present on the road; in the acquiring of the photography condition, country information is acquired, the country information being used to identify a country in which the image data was captured; in the selecting, a classifier corresponding to the acquired country information is selected from a plurality of classifiers, each of which was created for one of a plurality of different countries; and in the identifying, the road sign in the acquired image data is identified by using the selected classifier. Therefore, it is possible to identify a road sign in image data captured in a particular country.

In the identification method described above, the photography condition may indicate a weather in a place where the image data was acquired; in the acquiring of the photography condition, information about the weather in the place where the image data was acquired may be acquired; and in the selecting, a classifier corresponding to the acquired information about the weather may be selected from a plurality of classifiers, each of which was created for one of a plurality of different weathers.

With this structure, the photography condition indicates a weather in a place where the image data was acquired; in the acquiring of the photography condition, information about the weather in the place where the image data was acquired is acquired; and in the selecting, a classifier corresponding to the acquired information about the weather is selected from a plurality of classifiers, each of which was created for one of a plurality of different weathers. Therefore, it is possible to identify a target in image data captured in a particular weather.

In the identification method described above, the photography condition may indicate a time zone in which the image data was acquired; in the acquiring of the photography condition, the time zone in which the image data was acquired may be acquired; and a classifier corresponding to the acquired time zone may be selected from a in the selecting, plurality of classifiers, each of which was created for one of a plurality of different time zones.

With this structure, the photography condition indicates a time zone in which the image data was acquired; in the acquiring of the photography condition, the time zone in which the image data was acquired is acquired; and in the selecting, a classifier corresponding to the acquired time zone is selected from a plurality of classifiers, each of which was created for one of a plurality of different time zones.

Therefore, it is possible to identify a target in image data captured in a particular time zone.

In the identification method described above, the photography condition may indicate any one of an urban area, mountain area, and coastal area in which the image data was acquired; in the acquiring of the photography condition, place information may be acquired, the place information being used to identify whether a place in which the image data was acquired is any one of an urban area, mountain area, and coastal area; and in the selecting, a classifier corresponding to the acquired place information may be selected from a plurality of classifiers, each of which was created for one of an urban area, mountain area, and coastal area.

With this structure, the photography condition indicates any one of an urban area, mountain area, and coastal area in which the image data was acquired; in the acquiring of the photography condition, place information is acquired, the place information identifying whether a place in which the image data was acquired is any one of an urban area, mountain area, and coastal area; and in the selecting, a classifier corresponding to the acquired place information is selected from a plurality of classifiers, each of which was created for one of an urban area, mountain area, and coastal area. Therefore, it is possible to identify a target in image data captured in any one of an urban area, mountain area, and coastal area.

An identification apparatus according to another aspect of the present disclosure includes a storage, and also includes a circuitry that, in operation, performs operations including acquiring image data, acquiring a photography condition for the image data, selecting a classifier corresponding to the acquired photography condition from a plurality of classifiers, each of which was created for one of a plurality of photography conditions, and identifying a target in the acquired image data by using the selected classifier.

With this structure, image data is acquired; a photography condition for the image data is acquired; a classifier corresponding to the acquired photography condition is selected from a plurality of classifiers, each of which was created for one of a plurality of different photography conditions; and the target in the acquired image data is identified by using the selected classifier.

Therefore, a target in image data is identified by using a classifier that has been learned by using learning-use image data acquired under the same photography condition as for image data acquired during identification, so it is possible to highly precisely identify a target.

A classifier creating method according to another aspect of the present invention is for creating a classifier that identifies a target in image data. The classifier creating method includes: acquiring a plurality of learning-use image data items, each of which was captured under a different photography condition; and creating a plurality of classifiers that differ for each photography condition by entering the plurality of acquired learning-use image data items into predetermined learning models for each photography condition, learning information indicating a feature of the target for each photography condition, and applying the information indicating the feature of the target to the predetermined learning models provided for each photography condition.

With this structure, a plurality of learning-use image data items, each of which was captured under a different photography condition, are acquired; and a plurality of classifiers that differ for each photography condition are created by entering the plurality of acquired learning-use image data items into predetermined learning models for each photography condition, learning information indicating a feature of the target for each photography condition, and applying the information indicating the feature of the target to the predetermined learning models provided for each photography condition.

Therefore, since classifiers are learned by using only learning-use image data corresponding to a predetermined photography condition instead of unconditionally using learning-use image data, it is possible to shorten learning time.

A classifier creating apparatus according to another aspect of the present disclosure creates a classifier that identifies a target in image data. The classifier creating apparatus includes: a storage; and a circuitry that, in operation, performs operations including acquiring a plurality of learning-use image data items, each of which was captured under a different photography condition and creating a plurality of classifiers that differ for each photography condition by entering the plurality of acquired learning-use image data items into predetermined learning models for each photography condition, learning information indicating a feature of the target for each photography condition, and applying the information indicating the feature of the target to the predetermined learning models provided for each photography condition.

With this structure, a plurality of learning-use image data items, each of which was captured under a different photography condition, are acquired, and a plurality of classifiers that differ for each photography condition are created by entering the plurality of acquired learning-use image data items into predetermined learning models for each photography condition, learning information indicating a feature of the target for each photography condition, and applying the information indicating the feature of the target to the predetermined learning models provided for each photography condition.

Therefore, since classifiers are learned by using only learning-use image data corresponding to a predetermined photography condition instead of unconditionally using learning-use image data, it is possible to shorten learning time.

Embodiments of the present disclosure will be described below with reference to the attached drawings. The embodiments described below are only specific examples of the present disclosure and do not restrict the technical range of the present disclosure.

First Embodiment

A learning system and an identification system according to a first embodiment will be described.

FIG. 1 is a block diagram illustrating the structure of a learning system according to the first embodiment. The earning system in FIG. 1 includes a learning apparatus 1, a camera 101, a global positioning system (GPS) receiver 103, and a user input acceptor 107.

The learning apparatus 1 creates a classifier that identifies a target in image data. The learning apparatus 1 includes an image data accumulator 102, a photography condition acquirer 104, an image data acquirer 105, a sorter 106, a label assigner 108, a learner 109, and a memory 110. The camera 101, GPS receiver 103, and user input acceptor 107 may be incorporated into the learning apparatus 1.

The camera 101, which is an example of an imaging apparatus, captures learning-use images under different photography conditions. A photography condition indicates, for example, a region in which image data was acquired. The learning system is mounted in, for example, a vehicle. The camera 101 takes a picture of a scene in the traveling direction (forward direction) of the vehicle.

The image data accumulator 102 accumulates a plurality of learning-use image data items captured by the camera 101. The image data accumulator 102 may accumulate a plurality of learning-use image data items acquired through, for example, the Internet or another network.

The GPS receiver 103 acquires the current position of the learning apparatus 1, that is, the position at which a learning-use image was captured. The current position is represented by, for example, a latitude and longitude.

The photography condition acquirer 104 acquires the current position, acquired by the GPS receiver 103, of the learning apparatus 1, that is, the position at which a learning-use image was captured, and identifies a region in which the learning-use image was captured from the acquired position. The photography condition acquirer 104 assigns photography condition information, which is the region in which the learning-use image data was captured, to the learning-use image data captured by the camera 101 and accumulated in the image data accumulator 102.

The image data acquirer 105 acquires a plurality of learning-use image data items, each of which was captured under a different photography condition, from the image data accumulator 102. For example, the image data acquirer 105 acquires a plurality of learning-use image data items, each of which was captured in a different region.

The sorter 106 sorts the plurality of learning-use image data items acquired by the image data acquirer 105 for each photography condition.

The user input acceptor 107 is formed from a touch panel, a keyboard, or another user interface. The user input acceptor 107 accepts an input of a correct label indicating a target identified by the classifier. If the target is, for example, a pedestrian, the user input acceptor 107 accepts an input of a correct label indicating a pedestrian. The correct label is used in machine learning.

The label assigner 108 performs annotation processing in which the correct label entered from the user input acceptor 107 is assigned to each of the plurality of learning-use image data items sorted by the sorter 106.

The learner 109 creates a plurality of classifiers that differ for each photography condition by entering the plurality of learning-use image data items acquired by the image data acquirer 105 into predetermined learning models for each photography condition, learning information indicating a feature of the target for each photography condition, and applying the information indicating the feature of the target to the predetermined learning models provided for each photography condition. The learner 109 uses deep learning, which is one type of machine learning, to learn the plurality of learning-use image data items sorted for each photography condition. A description of deep learning will be omitted because it is a general technology.

The memory 110 stores the plurality of classifiers created by the learner 109. The memory 110 includes a first classifier 111, a second classifier 112, and a third classifier 113. The first classifier 111, second classifier 112, and third classifier 113 correspond to different photography conditions.

The first classifier 111 is, for example, a classifier created by using a plurality of learning-use image data items captured in a first region. The second classifier 112 is, for example, a classifier created by using a plurality of learning-use image data items captured in a second region, which differs from the first region. The third classifier 113 is, for example, a classifier created by using a plurality of learning-use image data items captured in a third region, which differs from the first region and second region. The first region is, for example, Californian in the USA. The second region is, for example, Tokyo in Japan. The third region is, for example, Beijing in China. Although, in this embodiment, the memory 110 includes three classifiers, which are the first classifier 111, second classifier 112, and third classifier 113, the present disclosure is not limited to this. The memory 110 may include only two classifiers or four or more classifiers.

Next, the operation of the learning system according to the first embodiment will be described.

Figure 2:
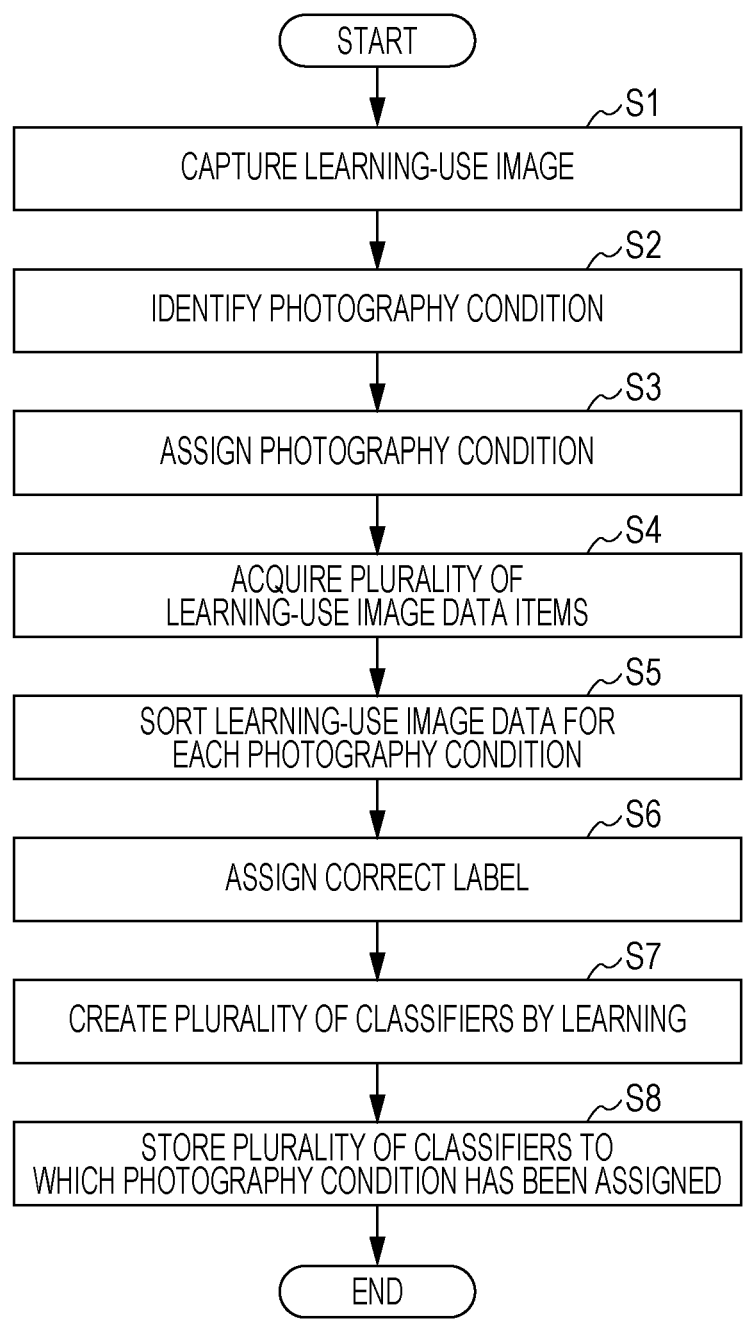
FIG. 2 is a flowchart illustrating the operation of the learning system according to the first embodiment.

FIG. 2 is a flowchart illustrating the operation of the learning system according to the first embodiment.

First, in step S1, the camera 101 captures a learning-use image under a predetermined photography condition. The photography condition is, for example, a region in which image data was acquired. The camera 101 captures learning-use image in the first region. The camera 101 stores the captured learning-use image data in the image data accumulator 102. The camera 101 may accumulate, in the image data accumulator 102, a plurality of learning-use image data items captured at intervals of a predetermined time interval. Alternatively, the camera 101 may accumulate, in the image data accumulator 102, a plurality of learning-use image data items cut from a captured moving picture at intervals of a predetermined time interval.

Next, in step S2, the photography condition acquirer 104 acquires the position, acquired by the GPS receiver 103, at which the learning-use image was captured, after which the photography condition acquirer 104 identifies, from the acquired position, a photography condition under which the learning-use image was captured. For example, the photography condition acquirer 104 identifies a region in which the learning-use image was captured from a latitude and longitude acquired by the GPS receiver 103 and map information stored in advance.

Next, in step S3, the photography condition acquirer 104 assigns photography condition information indicating a photography condition, which is a region in which the learning-use image data was captured, to the learning-use image data that was captured by the camera 101 and accumulated in the image data accumulator 102.

Next, in step S4, the image data acquirer 105 acquires a plurality of learning-use image data items, each of which was captured under a different photography condition, from the image data accumulator 102.

Next, in step S5, the sorter 106 sorts the plurality of learning-use image data items acquired by the image data acquirer 105 for each photography condition.

Next, in step S6, the label assigner 108 assigns a correct label indicating a target identified by the classifier, the correct label having been entered from the user input acceptor 107, to each of the plurality of learning-use image data items sorted by the sorter 106.

Next, in step S7, to create a plurality of classifiers that differ for each photography condition, the learner 109 enters the plurality of learning-use image data items sorted by the sorter 106 into neural network models for each photography condition, learns weight information, which indicates a feature of the target, for each photography condition, and applies the weight information to the neural network models provided for each photography condition.

Next, in step S8, the learner 109 assigns photography condition information, which indicates a photography condition, to each of the plurality of created classifiers, and stores, in the memory 207, the plurality of classifiers to which the photography condition has been assigned.

As described above, since classifiers are learned by using only learning-use image data corresponding to a predetermined photography condition instead of unconditionally using learning-use image data, learning time can be shortened.

Figure 3:
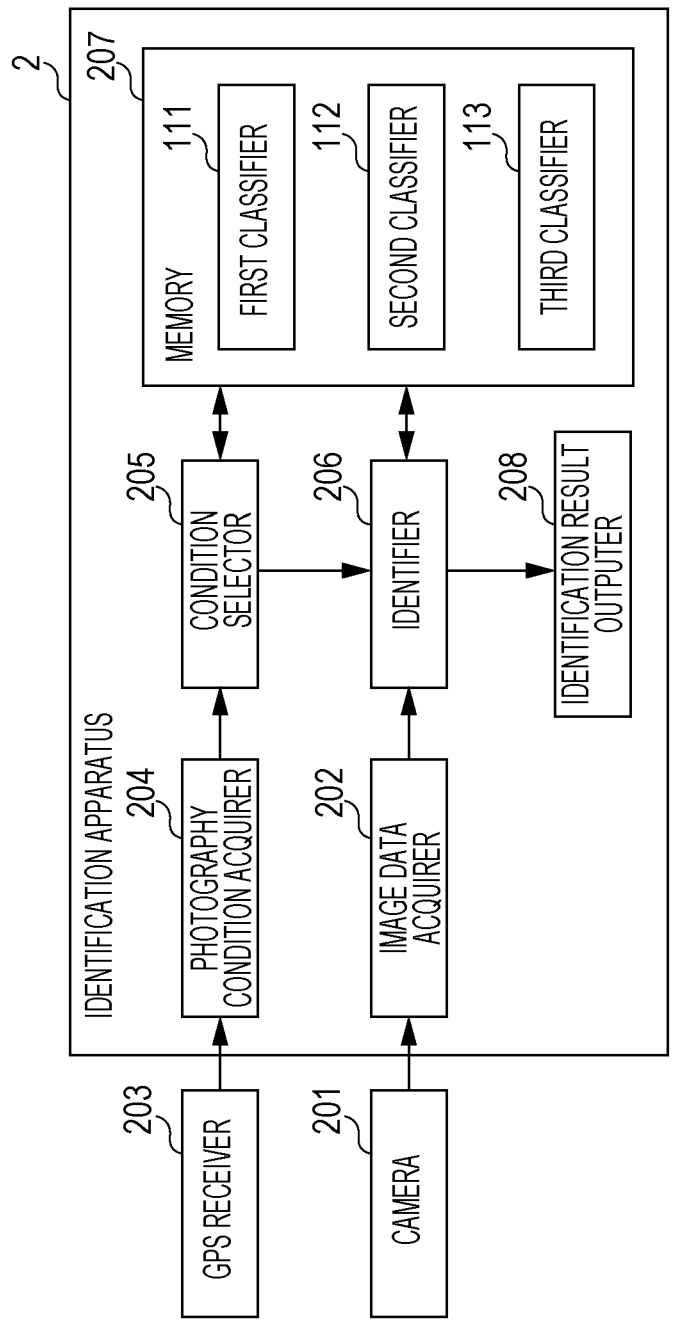
FIG. 3 is a block diagram illustrating the structure of an identification system according to the first embodiment.

FIG. 3 is a block diagram illustrating the structure of an identification system according to the first embodiment. The identification system in FIG. 3 includes an identification apparatus 2, a camera 201, and a global positioning system (GPS) receiver 203.

The identification apparatus 2 identifies a target in image data by using a classifier. The identification apparatus 2 includes an image data acquirer 202, a photography condition acquirer 204, a condition selector 205, an identifier 206, a memory 207, and an identification result outputer 208. The camera 201 and GPS receiver 203 may be incorporated into the identification apparatus 2.

The camera 201 captures an image under a predetermined photography condition. An example of a photography condition is a region in which image data was acquired. The identification system is mounted in, for example, a vehicle. The camera 201 takes a picture of a scene in the traveling direction (forward direction) of the vehicle.

The image data acquirer 202 acquires image data captured by the camera 201. The image data is acquired when the camera 201, which is mounted in a moving body that travels on a road, takes a picture.

The GPS receiver 203 acquires the current position of the identification apparatus 2, that is, the position at which an image was captured. The current position is represented by, for example, a latitude and longitude.

The photography condition acquirer 204 acquires a photography condition for image data. For example, the photography condition acquirer 204 acquires regional information used to identify a region in which the image data was captured.

The condition selector 205 selects a classifier corresponding to the acquired photography condition from a plurality of classifiers, each of which was created for one of a plurality of different photography conditions. The plurality of classifiers are created by entering a plurality of learning-use image data items sorted for each of a plurality of photography conditions into predetermined learning models for each photography condition, learning information indicating a feature of the target for each photography condition, and applying the information indicating the feature of the target to the predetermined learning models provided for each photography condition. The target indicates, for example, an obstacle present on a road. An example of the obstacle is a pedestrian. The condition selector 205 selects a classifier corresponding to the acquired regional information from a plurality of classifiers, each of which was created for one of a plurality of different regions.

The identifier 206 identifies the target in the acquired image data by using the classifier selected by the condition selector 205. For example, the identifier 206 identifies an obstacle in the acquired image data by using the classifier selected by the condition selector 205.

The memory 207 stores a plurality of classifiers created by the learning apparatus 1. The memory 207 includes the first classifier 111, second classifier 112, and third classifier 113. The first classifier 111, second classifier 112, and third classifier 113 correspond to different photography conditions. The first classifier 111, second classifier 112, and third classifier 113 are stored in advance when the identification apparatus 2 is manufactured. The identification apparatus 2 may receive the first classifier 111, second classifier 112, and third classifier 113 from a server through a network.

The identification result outputer 208 outputs a result of identification performed by the identifier 206. The identification result may be information indicating whether the target has been identified or may be information indicating a position at which the target in image data has been identified.

Next, the operation of the identification system according to the first embodiment will be described.

Figure 4:
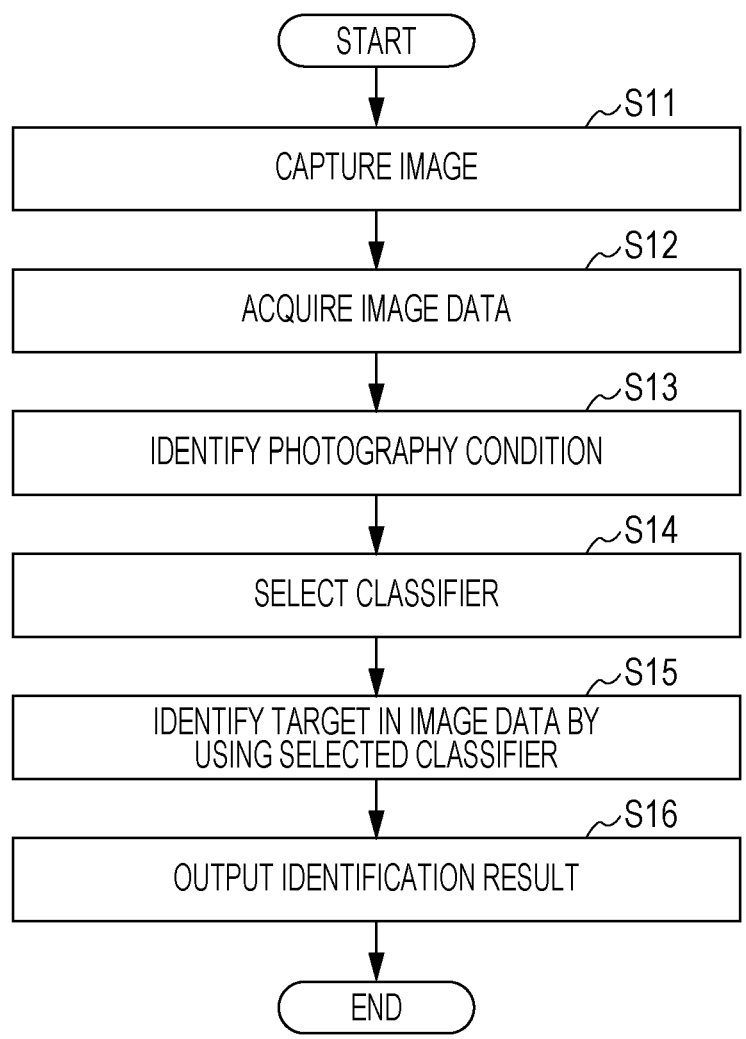
FIG. 4 is a flowchart illustrating the operation of the identification system according to the first embodiment.

FIG. 4 is a flowchart illustrating the operation of the identification system according to the first embodiment.

First, in step S11, the camera 201 captures an image under a predetermined photography condition. The photography condition is, for example, a region in which image data was acquired. The camera 201 captures an image in the first region.

Next, in step S12, the image data acquirer 202 acquires, from the camera 201, image data captured under the predetermined photography condition. For example, the image data acquirer 202 acquires, from the camera 201, image data captured in the first region.

Next, in step S13, the photography condition acquirer 204 acquires the position, acquired by the GPS receiver 203, at which the image was captured, after which the photography condition acquirer 204 identifies, from the acquired position, a photography condition under which the image was captured. For example, the photography condition acquirer 204 identifies a region in which the image was captured from a latitude and longitude acquired by the GPS receiver 203 and map information stored in advance.

Next, in step S14, the condition selector 205 selects a classifier corresponding to the photography condition identified by the photography condition acquirer 204, from a plurality of classifiers, each of which was created for one of a plurality of different photography conditions. If the photography condition identified by the photography condition acquirer 204 is the first region, the condition selector 205 selects the first classifier 111 corresponding to the first region.

Next, in step S15, the identifier 206 uses the classifier selected by the condition selector 205 to identify the target in the image data acquired by the image data acquirer 202. If the first classifier 111 is selected by the condition selector 205, the identifier 206 uses the first classifier 111 to identify the target in the image data acquired by the image data acquirer 202.

Next, in step S16, the identification result outputer 208 outputs a result of identification performed by the identifier 206.

As described above, a target in image data is identified by using a classifier that has been learned by using learning-use image data acquired under the same photography condition as for image data acquired during identification, so it is possible to highly precisely identify a target.

The identification system according to the first embodiment may further include a server connected so as to be capable of communicating with the identification apparatus 2 through a network. In this case, the identification apparatus 2 includes the image data acquirer 202, the photography condition acquirer 204, the identification result outputer 208, and a communicator. The communicator in the identification apparatus 2 transmits image data acquired by the image data acquirer 202 and a photography condition identified by the photography condition acquirer 204 to the server. The server includes a communicator, the condition selector 205, the identifier 206, and the memory 207. The communicator in the server receives the image data and photography condition transmitted by the identification apparatus 2. The communicator in the server also transmits a result of identification performed by the identifier 206 to the identification apparatus 2. The communicator in the identification apparatus 2 receives the identification result transmitted by the server. When a plurality of classifiers are stored in a server as described above, the capacity of the memory in the identification apparatus 2 can be reduced.

Although the photography condition in the first embodiment is a region, the present disclosure is not limited to this; the photography condition may be a country in which image data was acquired. In addition, the target in the first embodiment may be a road sign, guide sign, or warning sign present on a road. In this case, to create a plurality of classifiers that differ for each country, the image data acquirer 105 may acquire a plurality of learning-use image data items captured in different countries, the sorter 106 may sort the plurality of acquired learning-use image data items for each country, and the learner 109 may enter the plurality of acquired learning-use image data items into predetermined learning models for each country, may learn, for each country, information indicating a feature of the target, and may apply the information indicating the feature of the target to the predetermined learning models provided for each county. For example, the first classifier 111 is created by using learning-use image data captured in the USA, the second classifier 112 is created by using learning-use image data captured in Japan, and the third classifier 113 is created by using learning-use image data captured in China. The photography condition acquirer 204 may acquire country information used to identify a country in which image data was captured. The condition selector 205 may select a classifier corresponding to the acquired country information from a plurality of classifiers, each of which was created for one of a plurality of different countries. The identifier 206 may identify a load sign, guide sign, or warning sign in the acquired image data by using the selected classifier.

Alternatively, the photography condition in the first embodiment may be a weather in a place where image data was acquired. In this case, to create a plurality of classifiers that differ for each weather, the image data acquirer 105 may acquire a plurality of learning-use image data items captured in different weathers, the sorter 106 may sort the plurality of acquired learning-use image data items for each weather, and the learner 109 may enter the plurality of acquired learning-use image data items into predetermined learning models for each weather, may learn, for each weather, information indicating a feature of the target, and may apply the information indicating the feature of the target to the predetermined learning models provided for each weather. For example, the first classifier 111 is created by using learning-use image data captured in a fine day, the second classifier 112 is created by using learning-use image data captured in a cloudy day, and the third classifier 113 is created by using learning-use image data captured in a rainy day. The photography condition acquirer 204 may acquire information about a weather in a place where image data was acquired. The condition selector 205 may select a classifier corresponding to the acquired information about the weather from a plurality of classifiers, each of which was created for one of a plurality of different weathers.

Alternatively, the photography condition in the first embodiment may be a time zone in which image data was acquired. In this case, to create a plurality of classifiers that differ for each time zone, the image data acquirer 105 may acquire a plurality of learning-use image data items captured in different time zones, the sorter 106 may sort the plurality of acquired learning-use image data items for each time zone, and the learner 109 may enter the plurality of acquired learning-use image data items into predetermined learning models for each time zone, may learn, for each time zone, information indicating a feature of the target, and may apply the information indicating the feature of the target to the predetermined learning models provided for each time zone. For example, the first classifier 111 is created by using learning-use image data captured in a time zone from 0 o'clock to 8 o'clock, the second classifier 112 is created by using learning-use image data captured in a time zone from 8 o'clock to 16 o'clock, and the third classifier 113 is created by using learning-use image data captured in a time zone from 16 o'clock to 24 o'clock (0 o'clock). The photography condition acquirer 204 may acquire a time zone in which image data was acquired. The condition selector 205 may select a classifier corresponding to the acquired time zone from a plurality of classifiers, each of which was created for one of a plurality of different time zones.

Alternatively, the photography condition in the first embodiment may be any one of an urban area, mountain area, and coastal area. In this case, to create a plurality of classifiers that differ for each of an urban area, mountain area, and coastal area, the image data acquirer 105 may acquire a plurality of learning-use image data items captured in an urban area, mountain area, and coastal area, the sorter 106 may sort the plurality of acquired learning-use image data items for each of an urban area, mountain area, and coastal area, and the learner 109 may enter the plurality of acquired learning-use image data items into predetermined learning models for each of an urban area, mountain area, and coastal area, may learn, for each of an urban area, mountain area, and coastal area, information indicating a feature of the target, and may apply the information indicating the feature of the target to the predetermined learning models provided for each urban area, mountain area, or coastal area. For example, the first classifier 111 is created by using learning-use image data captured in an urban area, the second classifier 112 is created by using learning-use image data captured in a mountain area, and the third classifier 113 is created by using learning-use image data captured in a coastal area. The photography condition acquirer 204 may acquire place information used to identify whether a place in which the image data was acquired is any one of an urban area, mountain area, and coastal area. The condition selector 205 may select a classifier corresponding to the acquired place information from a plurality of classifiers, each of which was created for one of an urban area, mountain area, and coastal area.

Second Embodiment

An automated vehicle according to a second embodiment will be described.

Figure 5:
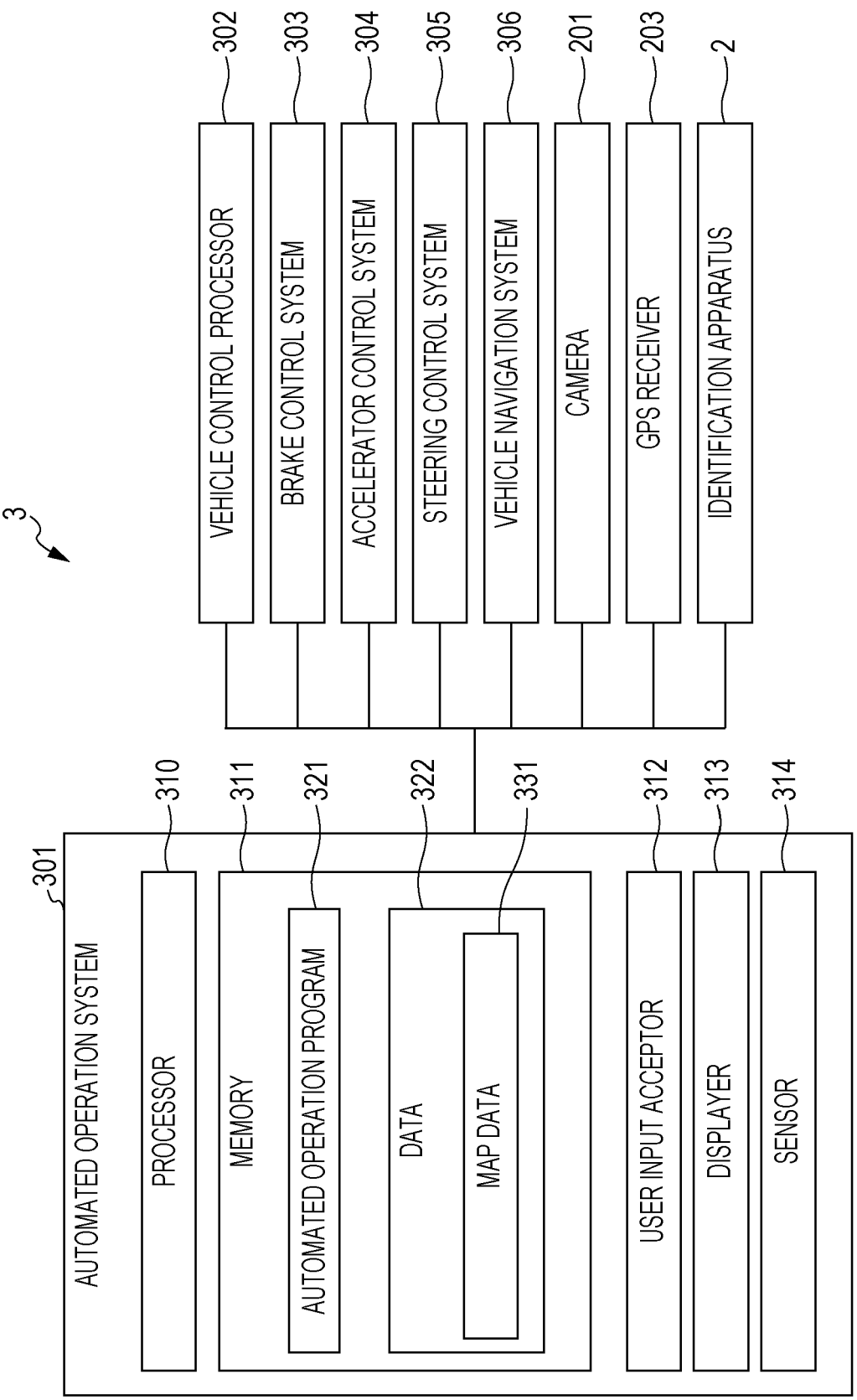
FIG. 5 is a block diagram illustrating the structure of an automated vehicle according to a second embodiment.

FIG. 5 is a block diagram illustrating the structure of an automated vehicle according to the second embodiment. The automated vehicle 3 in FIG. 5 includes an automated operation system 301, a vehicle control processor 302, a brake control system 303, an accelerator control system 304, a steering control system 305, a vehicle navigation system 306, the camera 201, the GPS receiver 203, and the identification apparatus 2.

The automated vehicle 3 autonomously travels. Although, in the second embodiment, the automated vehicle 3 is an automobile, the present disclosure is not limited to this; the automated vehicle 3 may be a motorcycle, a truck, a bus, an electric train, a flying body, or any other type of vehicle.

The automated operation system 301 includes a processor 310, a memory 311, a user input acceptor 312, a displayer 313, and a sensor 314.

The memory 311 is a computer-readable storage medium such as, for example, a hard disk, a read-only memory (ROM), a random-access memory (RAM), an optical disk, or a semiconductor memory. The memory 311 stores an automated operation program 321 and data 322. The data 322 includes map data 331. The map data 331 includes geological formation, lane information indicating a traveling lane, traffic intersection information related to traffic intersections, and speed limit information indicating a speed limit. However, the map data 331 is not limited to the above information.

The processor 310, which is, for example, a central processing unit (CPU), executes the automated operation program 321 stored in the memory 311. When the processor 310 executes the automated operation program 321, the automated vehicle 3 autonomously travels. The processor 310 reads out the data 322 from the memory 311, writes the data 322 to the memory 311, and updates the data 322 stored in the memory 311.

The user input acceptor 312 accepts various types of information entered by the user. The displayer 313 displays various types of information. The sensor 314 measures environments around and in the automated vehicle 3. The sensor 314 includes, for example, a speedometer that measures the speed of the automated vehicle 3, an accelerometer that measures the acceleration of the automated vehicle 3, a gyroscope that measures the orientation of the automated vehicle 3, and an engine temperature sensor. However, the sensor 314 is not limited to the above sensors.

The vehicle control processor 302 controls the automated vehicle 3. The brake control system 303 makes a control so that the automated vehicle 3 is decelerated. The accelerator control system 304 controls the speed of the automated vehicle 3. The steering control system 305 adjusts the direction of travel of the automated vehicle 3. The vehicle navigation system 306 determines a travel path of the automated vehicle 3 and presents a travel path of the automated vehicle 3.

The camera 201, which is placed in the vicinity of the rear-view mirror of the automated vehicle 3, captures an image in front of the automated vehicle 3. The camera 201 has the same structure as the camera 201 illustrated in FIG. 3. In addition to an image in front of the automated vehicle 3, the camera 201 may capture an image behind the automated vehicle 3, an image at the right of the automated vehicle 3, an image at the left of the automated vehicle 3, and other images around the automated vehicle 3.

The GPS receiver 203 acquires the current position of the automated vehicle 3. The GPS receiver 203 has the same structure as the GPS receiver 203 illustrated in FIG. 3.

The identification apparatus 2 identifies the target from image data captured by the camera 201, and outputs an identification result. The identification apparatus 2 has the same structure as the identification apparatus 2 illustrated in FIG. 3. The processor 310 controls the autonomous operation of the automated vehicle 3 according to the identification result from the identification apparatus 2. If, for example, the target is a pedestrian, the identification apparatus 2 identifies a pedestrian from the image data captured by the camera 201, and outputs an identification result. If a pedestrian is identified from the image data, the processor 310 controls the autonomous operation of the automated vehicle 3 so as to avoid the pedestrian, according to the identification result from the identification apparatus 2.

In addition to a pedestrian, the identification apparatus 2 may identify, from the image data, another vehicle, an obstacle present on a road, a traffic signal, a road sign, a travel lane, trees, or any other object outside the vehicle.

The processor 310 controls the direction and speed of the automated vehicle 3 according to a sensing result from the sensor 314 and an identification result from the identification apparatus 2. The processor 310 causes the accelerator control system 304 to accelerate the automated vehicle 3, causes the brake control system 303 to decelerate the automated vehicle 3, and causes the steering control system 305 to change the direction of the automated vehicle 3.

Next, image identification processing performed by the identification apparatus 2 in the automated vehicle 3 according to the second embodiment will be described.

Figure 6:
FIG. 6 illustrates an identification result obtained by identifying a pedestrian from image data captured in a first region, the pedestrian being identified by using a first classifier learned by using a plurality of learning-use image data items captured in the first region.
Figure 7:
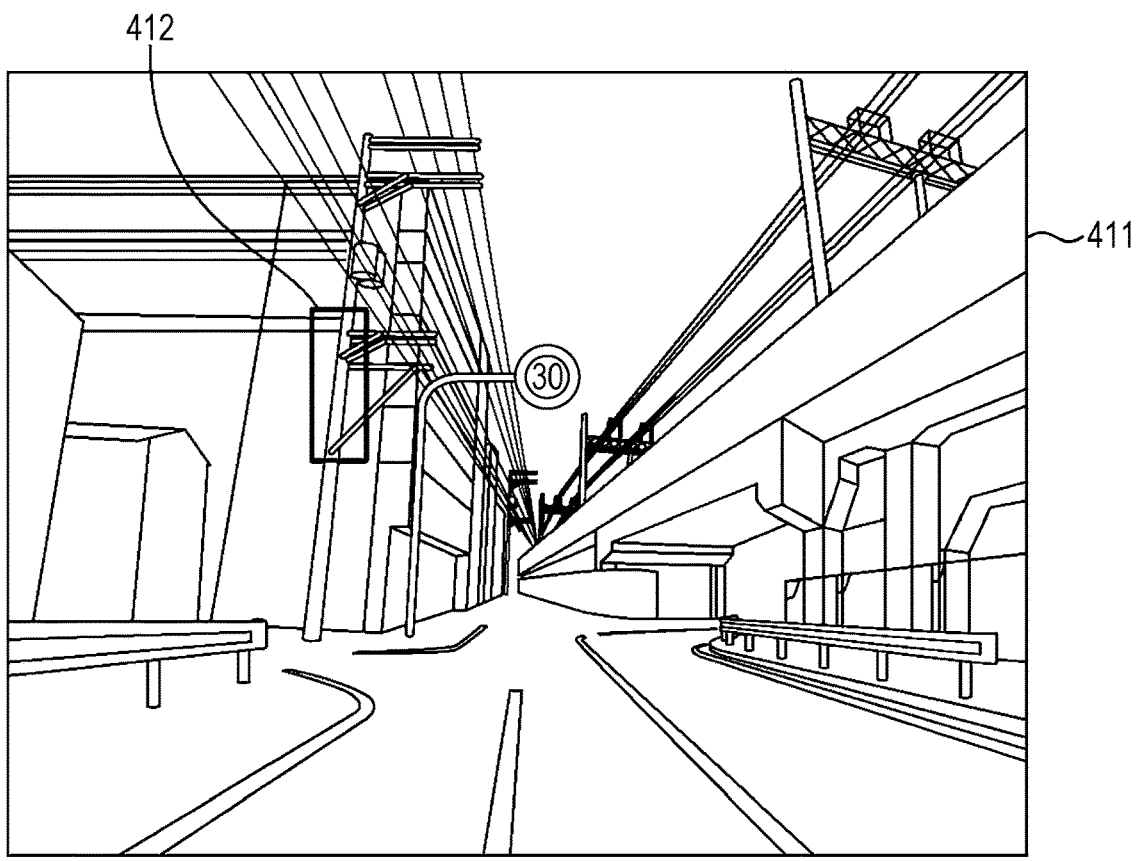
FIG. 7 illustrates an identification result obtained by incorrectly identifying a pedestrian from image data captured in a second region, which is different from the first region, the pedestrian being identified by using the first classifier learned by using a plurality of learning-use image data items captured in the first region.
Figure 8:
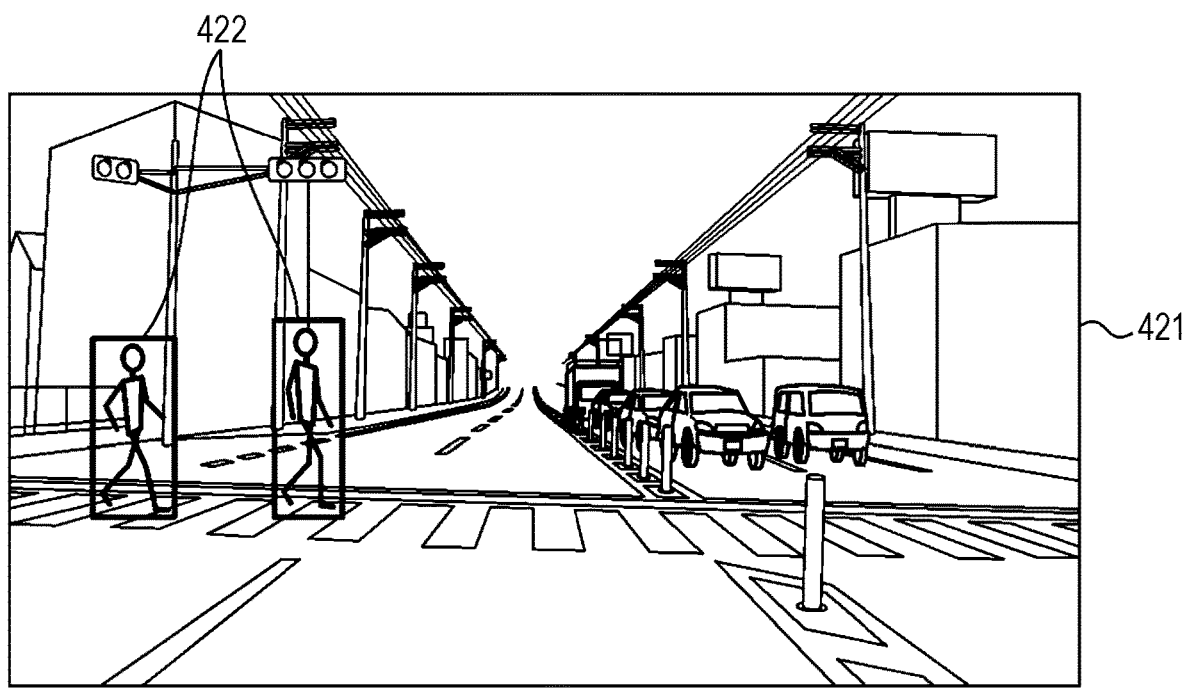
FIG. 8 illustrates an identification result obtained by identifying pedestrians from image data captured in the second region, the pedestrians being identified by using a second classifier learned by using a plurality of learning-use image data items captured in the second region.

FIG. 6 illustrates an identification result obtained by identifying a pedestrian from image data captured in the first region, the pedestrian being identified by using the first classifier learned by using a plurality of learning-use image data items captured in the first region. FIG. 7 illustrates an identification result obtained by incorrectly identifying a pedestrian from image data captured in the second region, which is different from the first region, the pedestrian being identified by using the first classifier learned by using a plurality of learning-use image data items captured in the first region. FIG. 8 illustrates an identification result obtained by identifying pedestrians from image data captured in the second region, the pedestrians being identified by using a second classifier learned by using a plurality of learning-use image data items captured in the second region.

The image 401 illustrated in FIG. 6 was captured in the first region. The first classifier 111 in the identification apparatus 2 was learned by using a plurality learning-use image data items captured in the first region. In this case, the photography condition acquirer 204 identifies that the photography condition is the first region, and the identifier 206 correctly identifies a pedestrian 402 by using the first classifier 111 corresponding to the first region to identify a pedestrian in the image 401.

The image 411 illustrated in FIG. 7 was captured in the second region, which differs from the first region. The first classifier 111 in the identification apparatus 2 was learned by using a plurality learning-use image data items captured in the first region. It will be assumed here that a classifier learned by using a plurality of learning-use image data items captured in the second region is not stored in the memory 207. If the identifier 206 uses the first classifier 111 to identify a pedestrian in the image 411, the identifier 206 incorrectly identifies a utility pole 412 as a pedestrian.

The image 421 illustrated in FIG. 8 was also captured in the second region. The second classifier 112 in the identification apparatus 2 was learned by using a plurality learning-use image data items captured in the second region. In this case, the photography condition acquirer 204 identifies that the photography condition is the second region, and the identifier 206 correctly identifies pedestrians 422 by using the second classifier 112 corresponding to the second region to identify pedestrians in the image 421.

As described above, a plurality of classifiers learned according to photography conditions are created and a target in image data is identified by using a classifier corresponding to the relevant photography condition. Therefore, a target in image data can be highly precisely identified in a particular photography condition.

Since the identification apparatus 2 can highly precisely identify a target such as a pedestrian, the identification apparatus 2 can be applied to an automated vehicle.

In the present disclosure, part or all of units, apparatuses, members, or sections or part or all of functional blocks in the block diagrams illustrated in drawings may be executed by one or a plurality of electronic circuits including semiconductor devices, semiconductor integrated circuits (ICs), or large-scale integrated (LSI) circuits. LSI circuits or ICs may be integrated into a single chip or may be configured by combining a plurality of chips. For example, functional blocks other than storage devices may be integrated into a single chip. Although an integrated circuit is referred to here as an LSI circuit or an IC, the name of an integrated circuit varies according to the degree of integration. An integrated circuit referred to as a system LSI circuit, a very large scale integrated (VLSI) circuit, or an ultra large scale integrated (ULSI) circuit may be used. A field programmable gate array (FPGA), which is programmed after an LSI circuit has been manufactured, or a reconfigurable logic device, in which junction relationships in an LSI circuit can be reconfigured or circuit compartments in an LSI circuit can be set up, can be used for the same purpose.

In addition, the functions or operations of part or all of units, apparatuses, members, or sections can be executed by software processing. In this case, when software recorded in one or a plurality of non-transitory recording media such as ROMs, optical disks, and hard disks is executed by a processor, a function identified by the software is executed by the processor and a peripheral device. A system or an apparatus may include one or a plurality of non-transitory recording media in which software is recorded, a processor, and a needed hardware device such as, for example, an interface.

The identification method and identification apparatus according to the present disclosure can highly precisely identify a target, so they are useful as an identification method and identification apparatus that identify a target in image data by using classifiers. Furthermore, the classifier creating method and classifier creating apparatus according to the present disclosure can shorten learning time, so they are useful as a classifier creating method and classifier creating apparatus that create classifiers used to identify a target in image data.

What is claimed is:

1. An identification method comprising:
   acquiring image data;
   acquiring a photography condition for the image data, the photography condition indicating a geographic location in which the image data was acquired;
   selecting a classifier corresponding to the acquired photography condition from a plurality of classifiers, wherein each of the plurality of classifiers was created for one of a plurality of different photography conditions and was generated by entering a plurality of learning use image data items, acquired by the image data acquirer, into predetermined learning models for each photography condition; and
   identifying a target in the acquired image data by using the selected classifier.

2. The identification method according to claim 1, wherein the plurality of classifiers are created by learning information indicating a feature of the target for each of the plurality of photography conditions, and applying the information indicating the feature of the target to the predetermined learning models provided for the each of the plurality of photography conditions.

3. The identification method according to claim 1, wherein:
   the image data is acquired when an imaging apparatus, which is mounted in a moving body that travels on a road, takes a picture;
   the photography condition indicates a region in which the image data was acquired; and
   the target indicates an obstacle present on the road;
   in the acquiring of the photography condition, regional information is acquired, the regional information being used to identify a region in which the image data was captured;
   in the selecting, a classifier corresponding to the acquired regional information is selected from a plurality of classifiers, each of which was created for one of a plurality of different regions; and
   in the identifying, the obstacle in the acquired image data is identified by using the selected classifier.

4. The identification method according to claim 1, wherein:
   the image data is acquired when an imaging apparatus, which is mounted in a moving body that travels on a road, takes a picture;
   the photography condition indicates a country in which the image data was acquired;
   the target indicates a road sign present on the road;
   in the acquiring of the photography condition, country information is acquired, the country information being used to identify a country in which the image data was captured;
   in the selecting, a classifier corresponding to the acquired country information is selected from a plurality of classifiers, each of which was created for one of a plurality of different countries; and
   in the identifying, the road sign in the acquired image data is identified by using the selected classifier.

5. The identification method according to claim 1, wherein:
   the photography condition indicates a weather in a place where the image data was acquired;
   in the acquiring of the photography condition, information about the weather in the place where the image data was acquired is acquired; and
   in the selecting, a classifier corresponding to the acquired information about the weather is selected from a plurality of classifiers, each of which was created for one of a plurality of different weathers.

6. The identification method according to claim 1, wherein:
   the photography condition indicates a time zone in which the image data was acquired;
   in the acquiring of the photography condition, the time zone in which the image data was acquired is acquired; and
   in the selecting, a classifier corresponding to the acquired time zone is selected from a plurality of classifiers, each of which was created for one of a plurality of different time zones.

7. The identification method according to claim 1, wherein:
   the photography condition indicates any one of an urban area, mountain area, and coastal area in which the image data was acquired;
   in the acquiring of the photography condition, place information is acquired, the place information being used to identify whether a place in which the image data was acquired is any one of an urban area, mountain area, and coastal area; and in the selecting, a classifier corresponding to the acquired place information is selected from a plurality of classifiers, each of which was created for one of an urban area, mountain area, and coastal area.

8. The identification method according to claim 2, further comprising receiving, by a user interface, input of a label associated with the target identified by the classifier and performing annotation processing, by a label assignor, on the label to assign the label to each of the plurality of sorted learning use image data items.

9. The identification method according to claim 2, wherein the sorted plurality of learning use image data items are entered into neural network models for each photography condition and the information indicating the feature of the target is applied to the neural network models for each photography condition.

10. The identification method according to claim 1, further comprising receiving, by a GPS receiver, position information at which the image data was acquired, the photography condition being assigned based upon the position information.

11. An identification apparatus comprising:
a storage; and
a circuitry that, in operation, performs operations including
acquiring image data,
acquiring a photography condition for the image data, the photography condition indicating a geographic location in which the image data was acquired,
selecting a classifier corresponding to the acquired photography condition from a plurality of classifiers, wherein each of the plurality of classifiers was created for one of a plurality of photography conditions, and was generated by entering a plurality of learning use data items, acquired by the image data acquirer, into predetermined learning models for each photography condition, and
identifying a target in the acquired image data by using the selected classifier.

12. The identification apparatus according to claim 11, wherein the image data is acquired when an imaging apparatus, which is mounted in a moving body that travels along a path, takes a picture, the photography condition indicates a region in which the image data was acquired, and the target indicates an obstacle present on the path;
in the acquiring of the photography condition, regional information is acquired, the regional information being utilized to identify the region in which the image data was acquired;
in the selecting, a classifier corresponding to the acquired regional information is selected from the plurality of classifiers, each of the plurality of classifiers was created for one of the plurality of different regions; and
in the identifying, the obstacle in the acquired image data is identified by utilizing the selected classifier.

13. The identification apparatus according to claim 11, wherein the image data is acquired when an imaging apparatus, which is mounted in a moving body that travels along the path, takes a picture, the photography condition indicates a country in which the image data was acquired, and the target indicates a sign present along the path;

in the acquiring of the photography condition, country information is acquired, the country information being utilized to identify a country in which the image data was acquired;
in the selecting, a classifier corresponding to the acquired country information is selected from the plurality of classifiers, each of the plurality of classifiers was created for one of a plurality of different countries; and
in the identifying, the sign in the acquired image data is identified by utilizing the selected classifier.

14. The identification apparatus according to claim 11, wherein the plurality of classifiers are created by learning information indicating a feature of the target for each of the plurality of photography conditions, and applying the information indicating the feature of the target to the predetermined learning models provided for each of the plurality of photography conditions.

15. The identification apparatus according to claim 14, wherein the operations further include receiving, by a user interface, input of a label associated with the target identified by the classifier and performing annotation processing, by a label assignor, on the label to assign the label to each of the plurality of sorted learning use image data items.

16. The identification apparatus according to claim 14, wherein the sorted plurality of learning use image data items are entered into neural network models for each photography condition and the information indicating the feature of the target is applied to the neural network models for each photography condition.

17. A classifier creating method for creating a classifier that identifies a target in image data, the method comprising:
acquiring a plurality of learning-use image data items, each of which was captured under a different photography condition, the photography condition indicating a geographic location in which the image data was acquired; and
creating a plurality of classifiers that differ for each photography condition by entering the plurality of acquired learning-use image data items into predetermined learning models for the each photography condition, learning information indicating a feature of the target for the each photography condition, and applying the information indicating the feature of the target to the predetermined learning models provided for the each photography condition.

18. The classifier creating method according to claim 17, wherein the plurality of learning use image data items are entered into neural network models for each photography condition and the information indicating the feature of the target is applied to the neural network models for each photography condition.

19. A classifier creating apparatus that creates a classifier that identifies a target in image data, the apparatus comprising:
a storage; and
a circuitry that, in operation, performs operations including
acquiring a plurality of learning-use image data items, each of which was captured under a different photography condition, the photography condition indicating a geographic location in which the image data was acquired; and
creating a plurality of classifiers that differ for each photography condition by entering the plurality of acquired learning-use image data items into predetermined learning models for the each photography condition, learning information indicating a feature of the target for the each photography condition, and applying the information indicating the feature of the target to the predetermined learning models provided for the each of the plurality of photography conditions.

20. The classifier creating apparatus according to claim 19, wherein the plurality of learning use image data items are entered into neural network models for each photography condition and the information indicating the feature of the target is applied to the neural network models for each photography condition.

* * * * *